March 1, 1927.

J. P. P. RIORDAN ET AL 1,619,766

HOSE CLAMPING TOOL

Filed July 17, 1924

Witness:

Arthur Thompson

Inventors:

James Peter Paul Riordan
Walter Murray

Patented Mar. 1, 1927.

1,619,766

UNITED STATES PATENT OFFICE.

JAMES PETER PAUL RIORDAN AND WALTER MURRAY, OF JOHANNESBURG, TRANSVAAL, SOUTH AFRICA.

HOSE CLAMPING TOOL.

Application filed July 17, 1924, Serial No. 726,526, and in Union of South Africa July 20, 1923.

The invention has reference to a tool or contrivance principally intended for securing clamping or fixing devices of wire, metal tape or band, et cetera, around hose or other flexible pipes for the purpose of fixing or securing the same upon a hose-pipe connection, a rigid pipe or the like. The tool is also applicable for fixing similar devices around pipes or like objects in order, for example, to secure patching or repairing material on or around the pipe, et cetera.

The object of the invention is to construct a simple and efficient tool by means of which the clamping or fixing device can be easily and quickly secured and in which the holding or retaining of the wire or tape is effected automatically by the tool while it is being operated to strain the wire or tape to tighten it around the pipe.

The invention will be more fully described in connection with the accompanying drawings, wherein, Fig. 1 is a part-sectional elevation of the tool in the position in which it is placed to commence the operation of fixing the clamping device around the hose-pipe, the clamping device and the hose-pipe being shown in dotted lines.

Figures 4, 5:
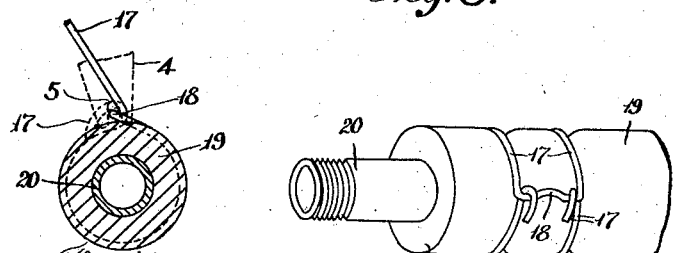

Fig. 4 is an enlarged detail view illustrating the clamping means in the position in which it is placed by the tool, and showing a portion of the tool in dotted lines in its final position, and the end or ends of the clamping device, also in dotted lines, after the same have been finally hammered down, and Fig. 5 is a perspective view showing the completed clamping device in position around a hose-pipe.

Figure 2:
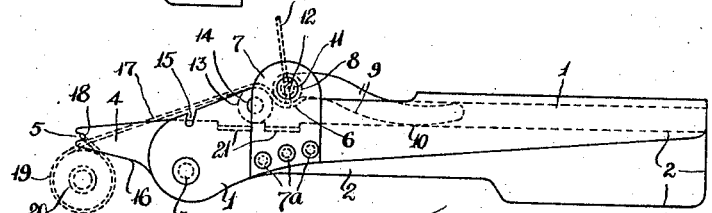
Fig. 2 is a side elevation of the tool in the position the parts are caused to assume to strain the clamping device.
Figure 3:
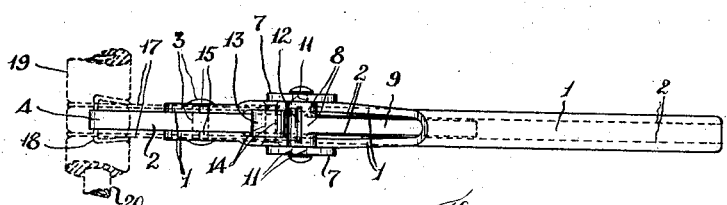
Fig. 3 is a plan of Fig. 2.

In the accompanying drawings we illustrate a practical embodiment of the invention wherein the tool comprises a pair of levers or handles 1, 2, the one lever 1 being bifurcated at one end and the other lever 2 being pivoted to said lever 1 in the bifurcation, as indicated at 3. One of these handles 2 is constructed with an extension 4 beyond the pivot 3, and in the outer end of such extension 4 there is formed a groove or notch 5. The other handle or lever 1 for a portion of its length remote from the pivot 3 may, as shown, be of U shape in cross-section, and is preferably fashioned on the top, some distance away from the pivot 3, with curved recesses 6. At the outer sides of the recesses 6 there are provided plates 7, shown fixed to the lever 1 by rivets 7ª, which plates 7 are slightly splayed or bent outwards like the sides of the lever 1, as shown in Fig. 3. Between these plates 7 and partially housed within the recesses 6 is mounted a rotatable piece 8 which is formed in one piece with, as shown, or has attached to it a tail piece or pin 9 which projects inwardly or through the channel of the lever 1 towards or in the direction of the other or opposite lever 2, so that when the levers 1, 2, are forced together the outer end of the tail piece or pin 9 is engaged by the top edge of the opposite lever 2, as seen at 10 in Fig. 2, and so rotates the piece 8 part of a revolution in its bearings 11 in the side plates 7.

Through the rotatable piece 8, preferably substantially at right angles to the tail piece or pin 9, and between the bearings 11 provided by the side plates 7 there is formed a slot 12. If the device is intended to be used for wire only, the piece 8 may be provided with two holes instead of the slot 12.

The sides of the lever 1 are maintained at the requisite distance apart near the side plates 7 by a combined distance and bearing piece 13 of suitable length, placed between the sides of the lever 1 and secured by means of a rivet or the like 14. The piece 13 provides a bearing surface for the wire or tape.

The lever 1 is provided with recesses 15 for cutting off the superfluous ends of the wire after the device has been fixed on the hose, the shearing of the wire being effected by partially closing the tool so that the adjacent bottom edge 16 of the extension of the single lever 2 serves as the co-operating cutting or shearing edge.

Figure 1:
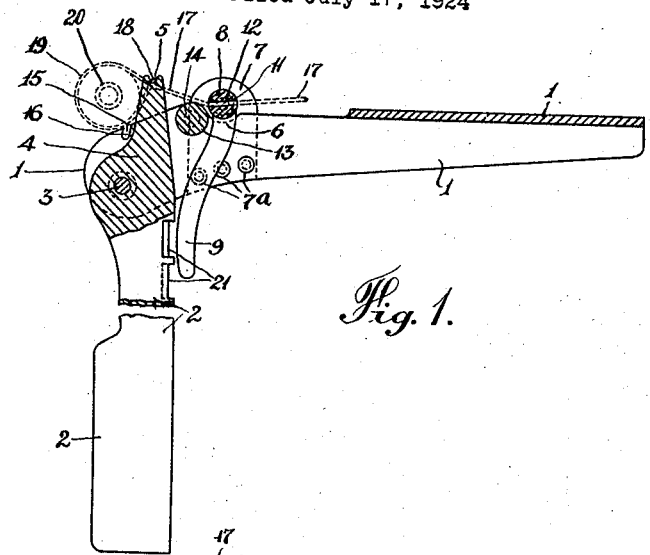

If wire be used for clamping the hose, et cetera, then it is bent into the customary shape, as shown in Fig. 5, so as to provide two parallel pieces 17 which are adapted to be passed through the loop or bight 18 formed by the bend. In using the tool the wire fixing device or clamp is put into position around the hose-pipe 19 with the ends 17 passing through the bight 18. The ends 17 are then projected through the slot 12 (or holes) in the rotating piece 8 and the loop or bight 18 placed in engagement with the groove or notch 5, the handles or levers 1, 2, being then in the fully expanded or open position, as shown in Fig. 1. The handles or levers 1, 2, are now partially closed or moved towards each other which causes the tail piece or pin 9 partially to rotate the rotatable piece 8 which bends or kinks the wire in the recesses 6, as shown in Fig. 2, and so obtains a firm grip of both ends 17 of the wire. The further closing of the levers 1, 2, by increasing the distance between the notch 5 and slot 12, strains the wire clamp and tightens it around the hose-pipe 19, so fixing it around the piece of pipe or connection 20. The tool is then pushed forward—see Fig. 4—to bend the ends 17 over the bight 18. The superfluous end portions are now cut off in the recesses 15 and the ends 17 hammered down.

One of the levers may be provided with an appropriately shaped part or surface which can be used as a hammer for hammering down the ends of the wire or tape after the device has been strained by the tool.

If a tape or band be employed instead of the wire, then one end of the tape or band is provided with a loop, buckle or slot through which the loose end of the tape or band is threaded in placing the tape or band around the hose-pipe. The straining is effected by the tool by pulling the end through the loop, buckle or slot, and the end then bent over in a similar manner to the wire device, the superfluous portion cut off and the end hammered down. For the tape or band the rotatable piece or member 8 is necessarily provided with a slot.

The cutter of the tool intended for a tape or band, either alone or in addition to the wire, is shown formed by bevelling off the inner edges of the one lever 2, as indicated at 21, to form the cutting or shearing edges to co-operate with the bottom edges of the other lever 1.

What we claim as our invention and desire to protect by Letters Patent is:—

1. A tool of the kind described for securing clamping devices, comprising a lever bifurcated at one end, a second lever pivoted to said lever in the bifurcation and constructed with an extension beyond its pivot and having a groove in the extension, bearings at the sides of the bifurcated end of the lever, and a rotatable piece journalled in said bearings and formed between the bearings with a hole passing therethrough and constructed with a tail piece adapted to pass through the bifurcation in the lever and to be engaged by the second lever to rotate the rotatable piece in order to retain a wire while the levers are being closed or operated to strain the wire, as set forth.

2. A tool of the kind described for securing clamping devices, comprising a lever bifurcated at one end, a second lever pivoted to said lever in the bifurcation and constructed with an extension beyond its pivot and having a groove in the extension, bearings at the sides of the bifurcated end of the lever, a rotatable piece journalled in said bearings and formed between the bearings with a hole passing therethrough and constructed with a tail piece adapted to pass through the bifurcation in the lever and to be engaged by the second lever to rotate the rotatable piece in order to retain a wire while the levers are being closed or operated to strain the said wire, and a bearing piece arranged in the bifurcation of the lever between the rotatable piece and the pivot, as set forth.

In testimony whereof we have signed our names to this specification.

JAMES PETER PAUL RIORDAN.
WALTER MURRAY.